Oct. 1, 1929.  C. B. THWING  1,730,308

TEMPERATURE INDICATING MEANS

Filed Sept. 3, 1925

Inventor.—
Charles B. Thwing.
by his Attorneys.—
Howson & Howson

Patented Oct. 1, 1929

1,730,308

UNITED STATES PATENT OFFICE

CHARLES B. THWING, OF PHILADELPHIA, PENNSYLVANIA, ASSIGNOR TO THWING INSTRUMENT COMPANY, OF PHILADELPHIA, PENNSYLVANIA, A CORPORATION OF PENNSYLVANIA

TEMPERATURE-INDICATING MEANS

Application filed September 3, 1925. Serial No. 54,315.

My invention relates to temperature indicating apparatus, and it has for one object the provision of a portable instrument which shall be particularly adapted to the measurement of the temperature of the rolls in a paper calendering machine, and the like.

Another object of my invention is to provide temperature indicating apparatus, wherein the thermocouple is positioned a minimum distance from the apparatus to be tested.

A further object of my invention is to provide apparatus of the class described, wherein the friction between the object to be tested and the movable supporting means for the thermocouple is a minimum.

A still further object of my invention is to provide temperature indicating apparatus, wherein the thermocouple is protected by means of a guard.

In the manufacture of paper, it is exceedingly important that the temperature of the rolls in the calendering machine be maintained at a predetermind temperature. Heretofore, such temperatures have been ascertained by observing the pressure of the steam supplied to the rolls. Experience has shown, however, that such methods of measuring temperatures are unreliable, inasmuch as the steam supply pipes become clogged, and the pressure readings are correspondingly inaccurate. A still further object of my invention, therefore, is to provide temperature-measuring apparatus which shall avoid such undesirable results.

Other objects and applications of my invention, as well as details of construction and arrangement, whereby my invention may be practiced, will appear more fully hereinafter, when taken in connection with the accompanying drawings, wherein.

Figure 5:
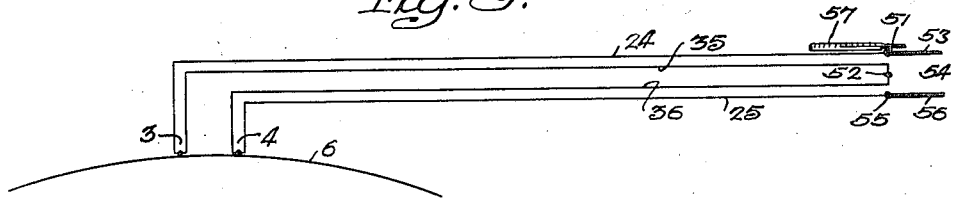
Fig. 5 is a diagrammatic view of circuits and apparatus embodying my invention.

My invention broadly comprises an elongated tubular handle 1 which terminates in an enlarged head portion 2 providing a housing for thermocouples 3 and 4, the latter being supported by anti-friction means 5 in spaced relation to a roll 6, and protected by means of a guard 7. By "anti-friction" as employed in the specification and claims, I mean roller bearings, ball bearings, or similar types of rotatable bearing means as differentiated from sliding or purely frictional contact. It is very desirable in my construction to reduce friction to a minimum in order to avoid detrimental local heating action.

The housing 2 may comprise a cylindrical side wall 8, which is provided with a tubular extension 9 having an internally threaded portion 11 adapted to engage a correspondingly threaded projecting portion 12 of a tubular member 13 rigidly positioned in an adjacent end 14 of the elongated tubular handle 1.

The cylindrical side wall 8 is provided with an upper flange 15 forming an opening 16 through which the thermocouples 3 and 4 may be removed when necessary. The opening 16 may be closed by a plate 17 secured in position by means of screws 18 which extend into the peripheral flange 15. A cylindrical supporting member 19 is rigidly clamped to the under side of the closure-plate 17 by means of a bolt 21 which extends through the plate 17 and the member 19. A strap 22 serves as a nut for the bolt 21.

Figure 4:
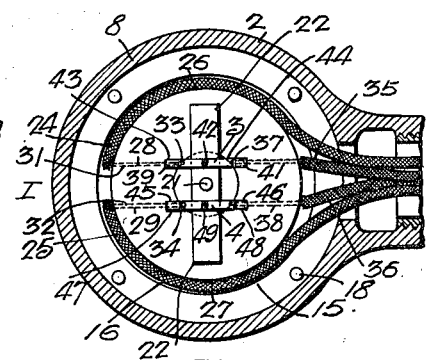
Fig. 4 is a horizontal sectional view, the sectional plane being taken on the line 4—4 of Fig. 1.

The supporting member 19 is preferably provided with a central core 23. The outer diameter of the supporting member 19 is somewhat smaller than that of the opening 16 so as to provide an annular groove adapted to receive flexible thermocouple wires 24 and 25. As shown in Fig. 4, these wires extend from the tubular handle 1 into the housing 2, where they are positioned on opposite sides 26 and 27 of the supporting member 19. The supporting member 19 is provided at 28 and 29 with perforations for the passage of extended portions 31 and 32 of the thermocouple wires 24 and 25, respectively.

Figure 1:
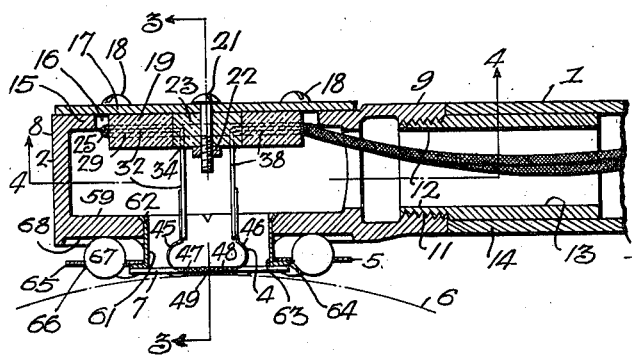
Figure 1 is a detail, longitudinal sectional view of the temperature indicating apparatus embodying my invention, the sectional plane being taken on the line 1—1 of Fig. 2.
Figure 3:
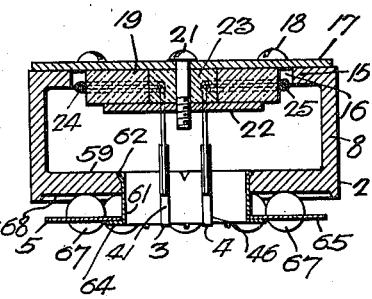
Fig. 3 is a transverse sectional view taken on the line 3—3 of Fig. 1.
Figure 2:
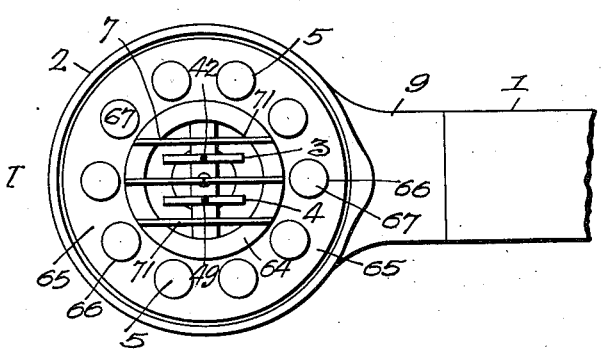
Fig. 2 is a bottom plan view of the structure of Fig. 1.

A pair of apertures 33 and 34 are formed at the meeting edges of the supporting member 19 and the core 23, providing outlet passages for the extensions 31 and 32, which project outwardly into the chamber formed by the housing 2, as shown in Figs. 1 and 3. A second pair of flexible thermocouple wires 35 and 36 are similarly mounted and provided with extensions 37 and 38, respectively.

The circuit for the thermocouple 3 is completed by extensions 39 and 41 from the supporting wires 31 and 37, the members 39 and 41 having a junction point 42. End portions 43 and 44 of the members 39 and 41, adjacent to the junction point 42, are substantially flat and positioned in a common plane. The thermocouple 4 is similarly constructed, and it is provided with extensions 45 and 46 from the supporting members 32 and 38, respectively. The extensions 45 and 46 have substantially flat portions 47 and 48 adjacent to a junction point 49, the flat portions 47 and 48 being disposed in the horizontal plane of the flat portions 43 and 44 of the thermocouple 3.

As shown in Fig. 5, the pair of thermocouple wires 24 and 35, constituting elements of the thermocouple 3, terminate at the opposite end of the tubular handle 1. These wires are respectively connected at junction points 51 and 52 to a conductor 53 of an external circuit 54, and to the wire 36, constituting one of the elements of the thermocouple 4. The other wire 25 of the thermocouple 4 is connected to a junction point 55, to which the remaining conductor 56 of the external circuit 54 is also connected. A thermometer 57 may be suitably positioned within the tubular handle 1 in proximity to the junction points 51, 52 and 53, as is customary.

One of the important features of the present invention is the provision of means 5, whereby the thermocouple housing 2 of the portable instrument may be supported on a moving object with a minimum friction, said means 5 also serving to support the thermocouple junctions 42 and 49 at a minimum distance from the desired object. To this end, I provide the cylindrical wall 8 of the housing 2 with an inwardly extending annular flange 59, formed with an opening through which the thermocouples 3 and 4 may extend.

A tubular member 61 has an upper end portion 62 slightly expanded, whereby it may be supported by the flange 59. A lower end 63 is provided with a laterally extending flange 64, affording a supporting shoulder for a plate 65 having a plurality of apertures 66 adapted to serve as seats for balls 67. The spacing of the plate 66 from the lower side 68 of the flange 59 is such as to permit the latter to serve as a raceway.

As previously noted, the substantially flat portions 43—44 and 47—48 of the thermocouples 3 and 4 lie in a substantially horizontal plane. Since this plane is very close to the object 6 under test, the possibility of damaging the exposed portions of the thermocouples 3 and 4 is materially decreased by means of the guard 7 which may comprise a wire-netting or, as shown in the drawing, a plurality of bars 71. The bars 71 may extend across the lower open end of the tube 61 substantially parallel to the flat thermocouple portions 43—44 and 47—48 and are secured to the supporting flange 64. The thermocouple portions 43—44 and 47—48 are positioned intermediate the bars 71 and substantially in the plane thereof so as to decrease the spacing of the thermocouples 3 and 4 from the object to be tested.

In operation, when the temperature of an object is to be measured, such, for example, as the calender roll 6 shown in the drawing, the operator supports the head 2 of the portable apparatus on the roll 6 with the balls 67 in engagement therewith. The close spacing between the thermocouple junction points 42 and 49 and the adjacent surface of the roll 6 results in a maximum response by the thermocouples 3 and 4, with consequent accuracy in temperature measurement. Such friction as obtains between the moving roll 6 and the housing 2 is reduced to a minimum, by reason of the anti-friction supporting means 5, but such heat as is developed is readily taken care of by the relatively large air-chamber directly above the thermocouple junction points 42 and 45, so that a very accurate indication of the temperature of the roll 6 may be obtained.

While I have shown only one form of embodiment of my invention, for the purpose of describing the same and illustrating its principles of construction and operation, it is apparent that various modifications and changes may be made therein without departing from the spirit of my invention, and I desire, therefore, that only such limitations shall be imposed thereon as are indicated in the appended claims or as are demanded by the prior art.

I claim:

1. An electrical instrument comprising temperature responsive means, a housing therefor, and anti-friction supporting means, whereby said first-mentioned means may be spaced in predetermined relation to a desired object.

2. An electrical instrument comprising a thermocouple, an elongated handle provided with a housing for said thermocouple, and anti-friction means, whereby said thermocouple may be supported in desired relation to an object.

3. A portable instrument comprising temperature responsive means, a housing for said means forming a containing chamber, and a roller-bearing for supporting said housing, whereby relative motion may obtain between said housing and a desired object.

4. A portable electrical instrument airchamber provided with an opening, temperature responsive means positioned in said chamber, a guard for said opening, and antifriction means, whereby relative motion may obtain between said means and a desired object with a minimum friction.

5. A temperature responsive instrument comprising a housing provided with an opening, a thermocouple positioned in said housing in proximity to said opening, and a guard for said opening.

6. A portable instrument comprising an elongated handle provided with a housing having an opening, anti-friction supporting means for said housing, and a guard for said opening.

7. Portable temperature indicating apparatus comprising a housing having an opening, a roller-bearing support for said housing, and protective means for said opening.

8. A temperature responsive instrument comprising a thermocouple, a housing therefor provided with an opening through which said thermocouple is accessible, a guard for said opening affording protection to said thermocouple, and a roller-bearing affording said housing an anti-friction support, said housing being adapted to serve as a raceway for the roller elements of said bearing.

9. An instrument comprising a supporting member provided with an opening, a thermocouple positioned at least in proximity to said opening, and a guard for said thermocouple comprising at least one bar.

10. An instrument comprising a supporting member provided with an opening, a therocouple positioned in said opening, a guard for said opening comprising a plurality of bars, and a roller-bearing support.

11. An electrical instrument comprising a member provided with an opening, a hollow member positioned in said opening, temperature responsive means positioned in proximity to one end of said hollow member, a guard for said temperature responsive means, and anti-friction supporting means.

12. A portable instrument comprising a tubular element, a plurality of bars for partially closing one end thereof, and a thermocouple positioned intermediate said bars.

13. An electrical instrument comprising a supporting member having an opening, a tube-like element positioned in said opening and having a projecting portion provided with a shoulder, a plurality of anti-friction elements, and a plate for retaining said anti-friction elements in engagement with said member, said plate being supported by said shoulder.

14. An electrical instrument comprising a supporting member provided with an opening, a tube-like device extending outwardly from said opening, a plurality of anti-friction elements, means for rotatably holding said elements in engagement with said member, temperature responsive means positioned in proximity to said opening, and a guard for said temperature responsive means.

15. An electrical instrument comprising a member provided with an opening, a tube extending outwardly from said opening and terminating in an end provided with a flange, a plurality of balls, a ring apertured to provide a seat for said balls, said ring being supported on said flange so as to position said balls adjacent to said supporting member, and a plurality of bars also carried by said tube.

16. An electrical instrument comprising a housing provided with an opening, a tubular member extending from said opening, a plurality of balls, a retaining plate carried by said tubular member and loosely carrying said balls, and means on the open end of said tubular member, preventing ingress thereto.

17. An electrical instrument comprising a housing having an opening in one side, a tubular member extending from said opening, a plurality of balls, a plate for retaining said balls in position so as to afford an anti-friction support for said housing, temperature responsive means positioned in said housing adjacent to said opening, and a guard carried by said tubular element.

18. An electrical instrument comprising a housing having openings in opposite sides thereof, a thermocouple positioned in proximity to one opening, and a closure for the other opening provided with supporting means for said thermocouple.

19. An elongated handle member provided with a housing having a pair of openings, a guard for one of said openings, a thermocouple positioned in proximity to said last-mentioned opening, and closure means for the other opening adapted to provide a support for said thermocouple.

20. An electrical instrument comprising a housing having a pair of openings, a guard for one of said openings, a thermocouple positioned in proximity to said last-mentioned opening, removable closure means for the other opening adapted to provide a support for said thermocouple, and anti-friction supporting means for said housing.

21. An elongated tubular element terminating in a housing provided with an opening, a thermocouple positioned in said opening, a guard for said thermocouple, and anti-friction means affording a support for said housing.

CHARLES B. THWING.